(12) United States Patent
Nathaniel et al.

(10) Patent No.: US 12,461,960 B1
(45) Date of Patent: Nov. 4, 2025

(54) SYSTEMS AND METHODS FOR MACHINE LEARNING-BASED CLASSIFICATION AND GOVERNANCE OF UNSTRUCTURED DATA USING CURATED VIRTUAL QUEUES

(71) Applicant: DryvIQ, Inc., Ann Arbor, MI (US)

(72) Inventors: Sean Nathaniel, Austin, TX (US); Steven E. Woodward, Canton, MI (US)

(73) Assignee: DryvIQ, Inc., Ann Arbor, MI (US)

( * ) Notice: Subject to any disclaimer, the term of this patent is extended or adjusted under 35 U.S.C. 154(b) by 0 days.

(21) Appl. No.: 18/759,168

(22) Filed: Jun. 28, 2024

(51) Int. Cl.
*G06F 16/353* (2025.01)

(52) U.S. Cl.
CPC .................. *G06F 16/353* (2019.01)

(58) Field of Classification Search
CPC ...... G06F 16/35; G06F 16/353; G06F 16/319; G06F 16/325; G06F 16/328; G06F 16/2255; G06F 16/2272
See application file for complete search history.

(56) References Cited

U.S. PATENT DOCUMENTS

| | | | | |
|---|---|---|---|---|
| 5,870,396 A * | 2/1999 | Abu-Amara | ........ | H04L 49/3081 370/413 |
| 6,094,649 A * | 7/2000 | Bowen | .................. | G06F 16/951 707/999.005 |
| 2006/0004717 A1 * | 1/2006 | Ramarathnam | ....... | G06F 16/951 |
| 2009/0234908 A1 * | 9/2009 | Reyhner | .................. | G06F 9/546 709/203 |
| 2014/0181014 A1 * | 6/2014 | Balakrishnan | ...... | G06F 16/2272 707/611 |
| 2014/0196056 A1 * | 7/2014 | Kottomtharayil | ... | G06F 9/45533 718/105 |
| 2017/0242880 A1 * | 8/2017 | Barzilli | ............... | G06F 16/2246 |
| 2020/0327394 A1 * | 10/2020 | Hultgren | ................ | G06N 3/044 |

* cited by examiner

Primary Examiner — Amanda L Willis
(74) Attorney, Agent, or Firm — Padowithz Alce; Alce PLLC

(57) ABSTRACT

A system and method for managing unstructured data stored across multiple data repositories is disclosed. The method includes accessing unstructured data items from distinct data repositories and generating classification metadata for each unstructured data item using a machine learning-based classifier. A residency pointer is generated for each unstructured data item based on residency metadata that identifies its storage location within the data repositories. An unstructured data metafile is automatically constructed for each unstructured data item. Each unstructured data metafile is assigned to one or more virtual queues based on its classification metadata, enabling organized data management. The method further integrates the virtual queues with a web-based data handling interface that facilitates batch operations on unstructured data items stored across the distinct repositories. The disclosed approach improves data classification, retrieval efficiency, and governance of unstructured data without requiring physical relocation of stored data items.

14 Claims, 10 Drawing Sheets

200

Implementing Data Feature Extraction 210

Computing Classification Inferences S220

Constructing Task Instructions S230

Identifying A Communications Scheme S240

Automatically Executing the Communications Scheme S250

Executing Data Handling Operations via Virtual Queues S260

Obtaining a Data Handling Request 262

Querying the Plurality of Virtual Queues S264

Identifying a Corpus of Metafiles S266

Using Residency Pointers to Execute Data Handling Operations S268

FIGURE 10

SYSTEMS AND METHODS FOR MACHINE LEARNING-BASED CLASSIFICATION AND GOVERNANCE OF UNSTRUCTURED DATA USING CURATED VIRTUAL QUEUES

TECHNICAL FIELD

This invention relates generally to the data handling and data governance fields, and more specifically to new and useful systems and methods for machine learning-based classifications of unstructured data items and governance of unstructured data in the data handling and data governance fields.

BACKGROUND

The increasing complexity of data storage and the prevalence of unstructured data pose significant challenges for data security and compliance. Traditional storage or data handling systems struggle with identifying and managing unstructured data and sensitive information. Additionally, misclassified digital items and unstructured digital items may further complicate attempts to successfully govern and/or manage digital items throughout any type of storage system.

In traditional on-premises and off-premises (e.g., cloud storage) data storage and nonintegrated or disjointed storage architectures, identifying data files and content that may include potentially sensitive information and further managing permissions for controlling access to files and content having high security threat and compliance risks can be especially difficult.

Thus, there are needs in the data handling and data governance fields to create improved systems and methods for intelligently handling data and providing high quality data, as well as intuitive data governance and controls that curtail the several data security and data compliance risks posed by legacy data storage and management architectures.

The embodiments of the present application described herein provide technical solutions that address, at least the needs described above.

BRIEF DESCRIPTION OF THE FIGURES

FIG. 2 illustrates an example method 200 in accordance with one or more embodiments of the present application;

FIG. 10 illustrates an example sub-method of S260 in accordance with one or more embodiments of the present application.

BRIEF SUMMARY OF THE INVENTION(S)

Figure 1:
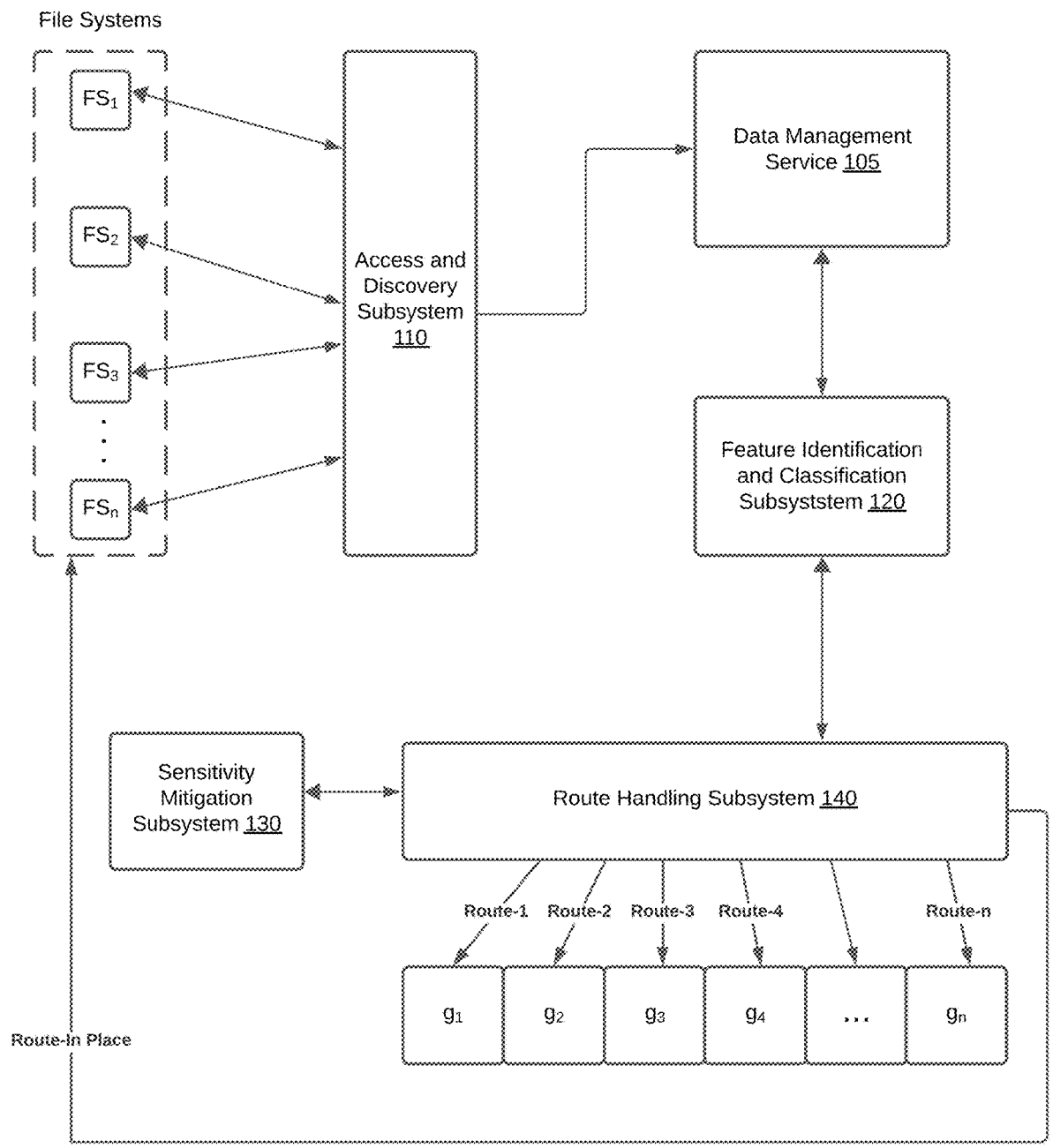
FIG. 1 illustrates a schematic representation of a system 100 in accordance with one or more embodiments of the present application.

In one embodiment, a computer-implemented method for managing unstructured data stored in a plurality of distinct data repositories includes accessing, at a remote data handling service, unstructured data items from a plurality of distinct data repositories associated with a subscriber to the remote data handling service; generating, via a machine learning-based classifier, classification metadata for each of the unstructured data items, wherein the classification metadata indicates a likely artifact category of a plurality of distinct artifact categories for each of the unstructured data items; generating, via one or more computer processors, a residency pointer for each of the unstructured data items based on residency metadata associated with each of the unstructured data items; automatically constructing an unstructured data metafile for each of the unstructured data items based at least on (a) the classification metadata and (b) the residency pointer associated with each of the unstructured data items; assigning the unstructured data metafile associated with each of the unstructured data items to one of a plurality of virtual queues based on the classification metadata associated with the unstructured data metafile; and integrating the plurality of virtual queues with a web-based data handling user interface to control operations against the unstructured data stored in each of the plurality of distinct data repositories.

In one embodiment, the method includes obtaining, via the web-based data handling interface, a data handling request; in response to obtaining the data handling request, using the data handling request to perform a search of the plurality of virtual queues; and returning from the plurality of virtual queues a corpus of metafiles based on the performance of the search.

In one embodiment, the method includes using residency pointers associated with the corpus of metafiles to locate a corresponding set of items of data stored within the plurality of distinct data repositories; and automatically executing one or more operations with the corresponding set of items of data based on requirements of the data handling request.

In one embodiment, each of the plurality of virtual queues comprises a metafile index associated with a given artifact category of the plurality of distinct artifact categories and that sorts unstructured data metafiles having a given classification metadata associated with the given artifact category.

In one embodiment, each virtual queue of the plurality of virtual queues comprises a metafile data structure (1) assigned to at least one distinct application of a plurality of distinct applications and (2) that stores unstructured data metafiles accessible to the at least one distinct application.

In one embodiment, each virtual queue of the plurality of virtual queues was created in a database associated with the remote data handling service and that is distinct from the plurality of distinct data repositories storing the unstructured data.

In one embodiment, the residency pointer comprises a digital record stored within a database associated with the remote handling service, and wherein the residency pointer provides data identifying a storage residency location of an associated data item of the unstructured data within a repository of the plurality of distinct data repositories.

In one embodiment, the machine learning-based classifier comprises a large language model, generating the classification metadata for each of the unstructured data items includes: generating an indexing prompt for each of the unstructured data items based on the classification metadata for each of the unstructured data items, and outputting, by the large language model, a likely destination to one of the plurality of virtual queues for each of the unstructured data items based on inputting to the large language model the indexing prompt for each of the unstructured data items.

In one embodiment, the computer-implemented method includes curating a corpus of training data samples comprising a subset of the unstructured data items based on executing one or more data sourcing operations via the web-based data handling user interface, wherein curating the corpus of training data samples includes: identifying a given virtual queue of the plurality of queues having an index of a plurality of unstructured data metafiles associated with the subset of the unstructured data items based on a command of the subscriber to the web-based data handling user interface; executing a copying operation of the subset of the unstructured data items from one or more of the plurality of distinct data repositories; and in response to executing the copying operation, storing copies of the subset of the unstructured data items to a memory accessible to an application for training a machine learning model.

In one embodiment, the residency metadata associated with each of the unstructured data items includes a storage location within the plurality of distinct data repositories of each of the unstructured data items, generating the residency pointer for each of the unstructured data items includes assigning the storage location of the residency metadata for each of the plurality items of unstructured data to the residency pointer for each of the unstructured data items.

In one embodiment, each virtual queue of the plurality of virtual queues comprises tabular data structure with cells that store the classification metadata and the residency pointer for each unstructured data item, wherein the cells of each virtual queue of the plurality of virtual queues includes: a first plurality of cells for storing the classification metadata for each of the unstructured data items, and a second plurality of cell for storing the residency pointer for each of the unstructured data items.

In one embodiment, the computer-implemented method includes automatically accessing the plurality of distinct data repositories on a pre-defined schedule; identifying new unstructured data based on the accessing; and in response to identifying the new unstructured data, updating one or more of the plurality of virtual queues with new unstructured data metafiles associated with the new unstructured data.

In one embodiment, a computer-program product embodied in a non-transitory machine-readable storage medium storing computer instructions that, when executed by one or more processors, includes accessing unstructured data items from a plurality of distinct data repositories associated with a subscriber to the remote data handling service; generating, via a machine learning-based classifier, classification metadata for each of the unstructured data items, wherein the classification metadata indicates a likely artifact category of a plurality of distinct artifact categories for each of the unstructured data items; generating a residency pointer for each of the unstructured data items based on residency metadata associated with each of the unstructured data items; automatically constructing an unstructured data metafile for each of the unstructured data items based at least on (a) the classification metadata and (b) the residency pointer associated with each of the unstructured data items; assigning the unstructured data metafile associated with each of the unstructured data items to one of a plurality of virtual queues based on the classification metadata associated with the unstructured data metafile; and integrating the plurality of virtual queues with a web-based data handling user interface to control operations against the unstructured data stored in each of the plurality of distinct data repositories.

In one embodiment, the residency pointer comprises a digital record stored within a database associated with the remote handling service, and wherein the residency pointer provides data identifying a storage residency location of an associated data item of the unstructured data within a repository of the plurality of distinct data repositories.

In one embodiment, the computer-program product includes curating a corpus of training data samples comprising a subset of the unstructured data items based on executing one or more data sourcing operations of an application being executed via the web-based data handling user interface, wherein curating the corpus of training data samples includes: identifying a given virtual queue of the plurality of queues having an index of a plurality of unstructured data metafiles associated with the subset of the unstructured data items based on a command of the subscriber to the web-based data handling user interface; executing a copying operation of the subset of the unstructured data items from one or more of the plurality of distinct data repositories; and in response to executing the copying operation, storing copies of the subset of the unstructured data items to a memory accessible to an application for training a machine learning model.

In one embodiment, the residency metadata associated with each of the unstructured data items includes a storage location within the plurality of distinct data repositories of each of the unstructured data items, generating the residency pointer for each of the unstructured data items includes assigning the storage location of the residency metadata for each of the plurality items of unstructured data to the residency pointer for each of the unstructured data items.

In one embodiment, each virtual queue of the plurality of virtual queues comprises tabular data structure with cells that store the classification metadata and the residency pointer for each unstructured data item, wherein the cells of each virtual queue of the plurality of virtual queues includes: a first plurality of cells for storing the classification metadata for each of the unstructured data items, and a second plurality of cells for storing the residency pointer for each of the unstructured data items.

In one embodiment, a method includes, at a remote data handling service, accessing unstructured data items from a plurality of distinct data repositories associated with a subscriber to the remote data handling service; generating, via a machine learning-based classifier, classification metadata for each of the unstructured data items, wherein the classification metadata indicates a likely artifact category of a plurality of distinct artifact categories for each of the unstructured data items; generating, by one or more computer processors, a residency pointer for each of the unstructured data items based on residency metadata associated with each of the unstructured data items; automatically constructing, by the one or more computer processors, an unstructured data metafile for each of the unstructured data items based at least on (a) the classification metadata and (b) the residency pointer associated with each of the unstructured data items; assigning the unstructured data metafile associated with each of the unstructured data items to one of a plurality of virtual queues based on the classification metadata associated with the unstructured data metafile; and integrating the plurality of virtual queues with a web-based data handling user interface to control operations against the unstructured data stored in each of the plurality of distinct data repositories.

In one embodiment, the residency pointer comprises a digital record stored within a database associated with the remote handling service, and wherein the residency pointer provides data identifying a storage residency location of an associated data item of the unstructured data within a repository of the plurality of distinct data repositories.

In one embodiment, the method includes curating a corpus of training data samples comprising a subset of the unstructured data items based on executing one or more data sourcing operations of an application being executed via the web-based data handling user interface, wherein curating the corpus of training data samples includes: identifying a given virtual queue of the plurality of data queues having an index of a plurality of unstructured data metafiles associated with the subset of the unstructured data items based on a command of the subscriber to the web-based data handling user interface; executing a copying operation of the subset of the unstructured data items from one or more of the plurality of distinct data repositories; and in response to executing the copying operation, storing copies of the subset of the unstructured data items to a memory accessible to an application for training a machine learning model.

In one embodiment, the residency metadata associated with each of the unstructured data items includes a storage location within the plurality of distinct data repositories of each of the unstructured data items, generating the residency pointer for each of the unstructured data items includes assigning the storage location of the residency metadata for each of the plurality items of unstructured data to the residency pointer for each of the unstructured data items.

In one embodiment, each virtual queue of the plurality of virtual queues comprises tabular data structure with cells that store the classification metadata and the residency pointer for each unstructured data item, wherein the cells of each virtual queue of the plurality of virtual queues includes: a first cell for storing the classification metadata for each of the unstructured data items, and a second cell for storing the residency pointer for each of the unstructured data items.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Intelligent Content Handling and Content Governance

As shown in FIG. 1, a system 100 for intelligent data handling and data governance includes a data handling and governance service 105, an access and discovery subsystem 110, a feature identification and classification subsystem 120, a sensitivity mitigation subsystem 130, and a content route handling subsystem 140, as described in U.S. patent application Ser. No. 17/849,555, which is incorporated herein in its entirety by this reference. The system 100 may sometimes be referred to herein as an intelligent data handling and data governance system 100 or simply the data handling system 100.

1.05 Intelligent Content Access+Content Handling Subsystem

The data handling and governance service 105, sometimes referred to herein as the "data handling service 105" may be implemented by a distributed network of computers and may be in operable and control communication with each of the subsystems of the system 100. That is, the data handling service 105 may include a centralized controlling computer server(s) and associated computing systems that encourages and/or controls the intelligent data handling, data classification, and data governance operations of each of the subsystems 110-140.

In one or more embodiments, the data handling service 105 may function to implement a data handling and data governance application programming interface (API) that enables programmatic communication and control between the data handling system 100 and the one or more sub-services therein and APIs of the one or more subscribers to the data handling service 105 of the data handling system 100.

1.1 Content Access+Discovery Subsystem

The access and discovery subsystem 110, which may be sometimes referred to herein as the "discovery subsystem" or "discovery subservice", preferably functions to enable one or more electronic connections between the data handling system 100 and one or more external systems of one or more subscribers and/or one or more users to the data handling service 105. The discovery subsystem may include one or more access modules that may function to establish or create content communication channels, which are sometimes referred to as "data management nexus" or "data handling nexus", between the data handling system 100 and subscriber systems. In one or more embodiments, the data handling nexus may include any suitable medium and/or method of transmitting digital items between at least two devices including, but not limited to, a service bus, a digital communication channel or line, and/or the like.

Figure 4:
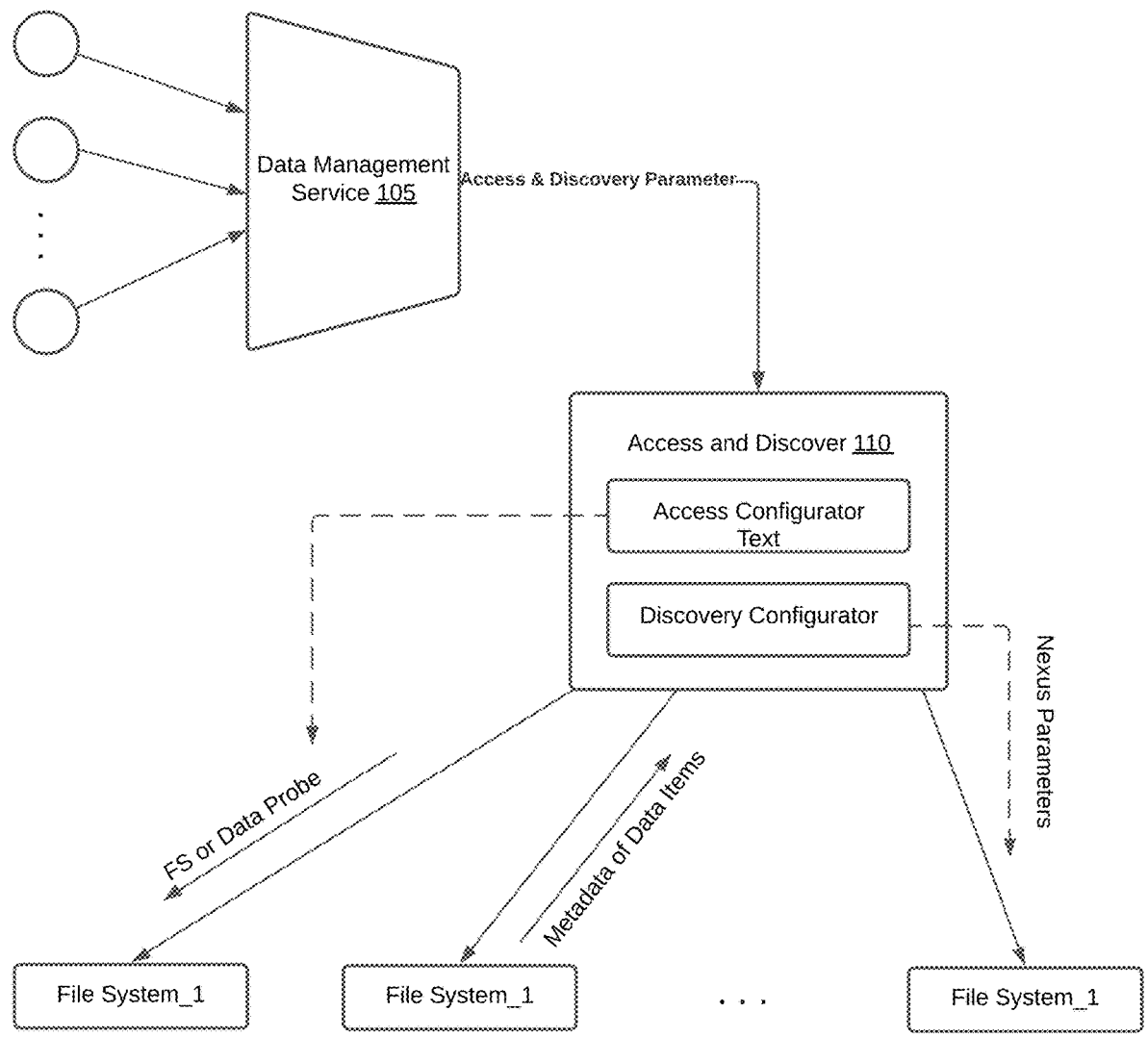
FIG. 4 illustrates a schematic representation of a second implementation of one or more sub-components of the system 100 in accordance with one or more embodiments of the present application.

The discovery subsystem 100 may additionally or alternatively include one or more discovery submodules that perform one or more content discovery actions and/or functions for identifying existing file and content systems within a computing architecture of a subscriber and/or user, as shown generally by way of example in FIG. 4.

1.2 Content Feature Identification and Classification Subsystem

Figure 5:
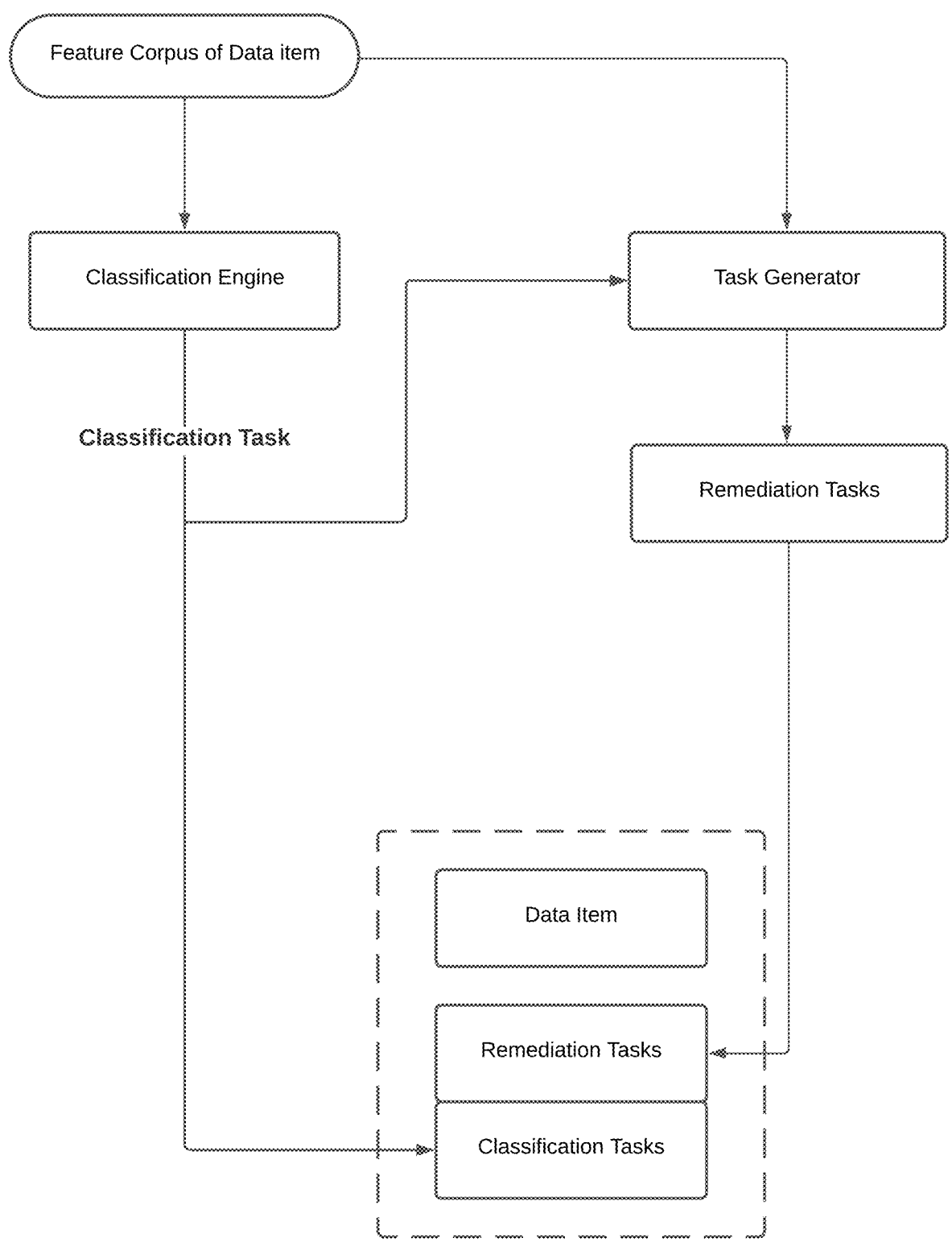
FIG. 5 illustrates a schematic representation of an example for generating action tasks for a data item in accordance with one or more embodiments of the present application.
Figure 6:
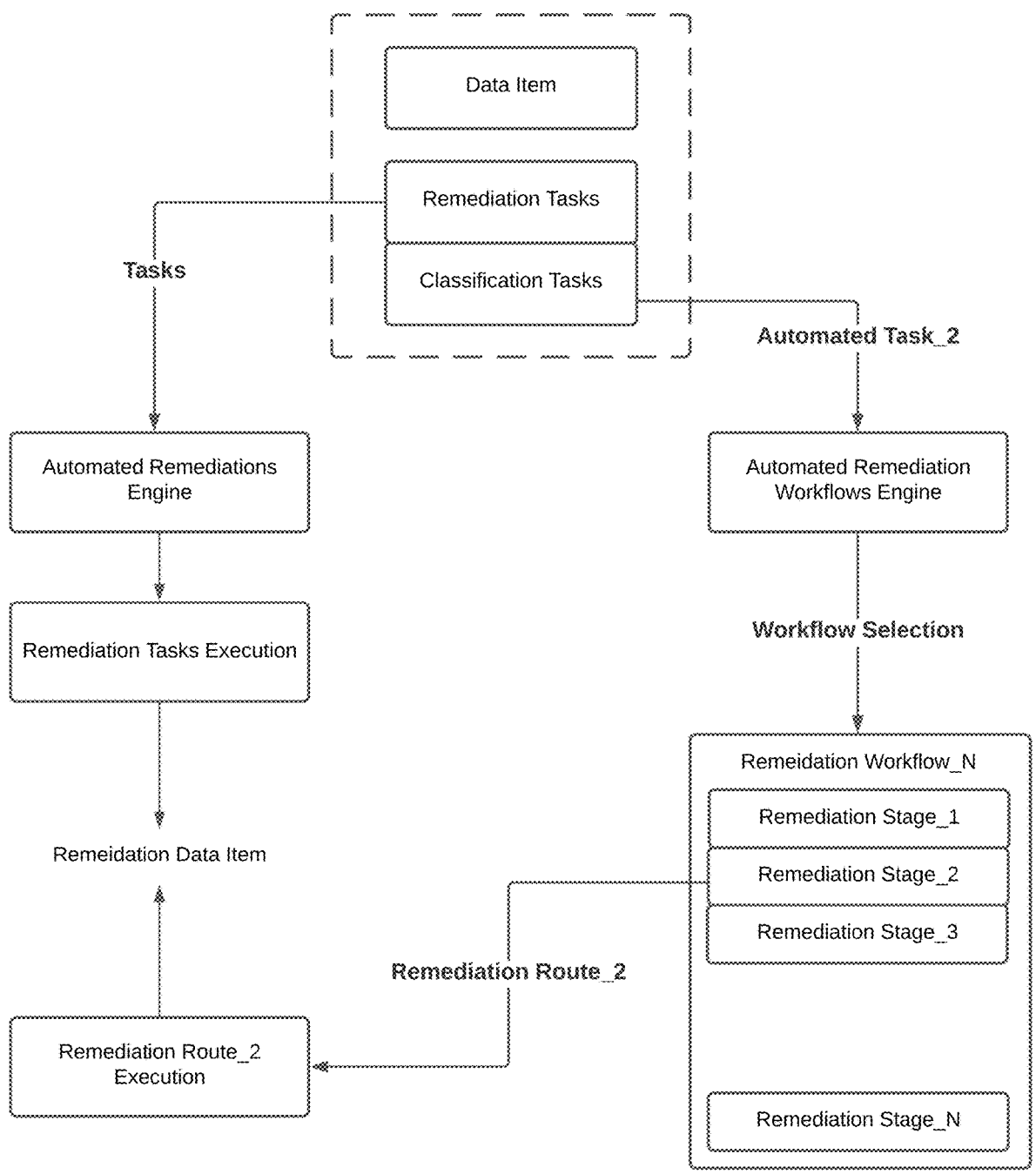
FIG. 6 illustrates a schematic representation of an example for implementing a remediation stage for handling a data item in accordance with one or more embodiments of the present application.

The feature identification and classification subsystem 120, which may sometimes be referred to herein as a "classification subsystem", preferably functions to compute one or more classification labels for each target file or target content being migrated and/or handled by the data handling system 100, as shown generally by way of example in FIG. 5 and FIG. 6.

Figure 3:
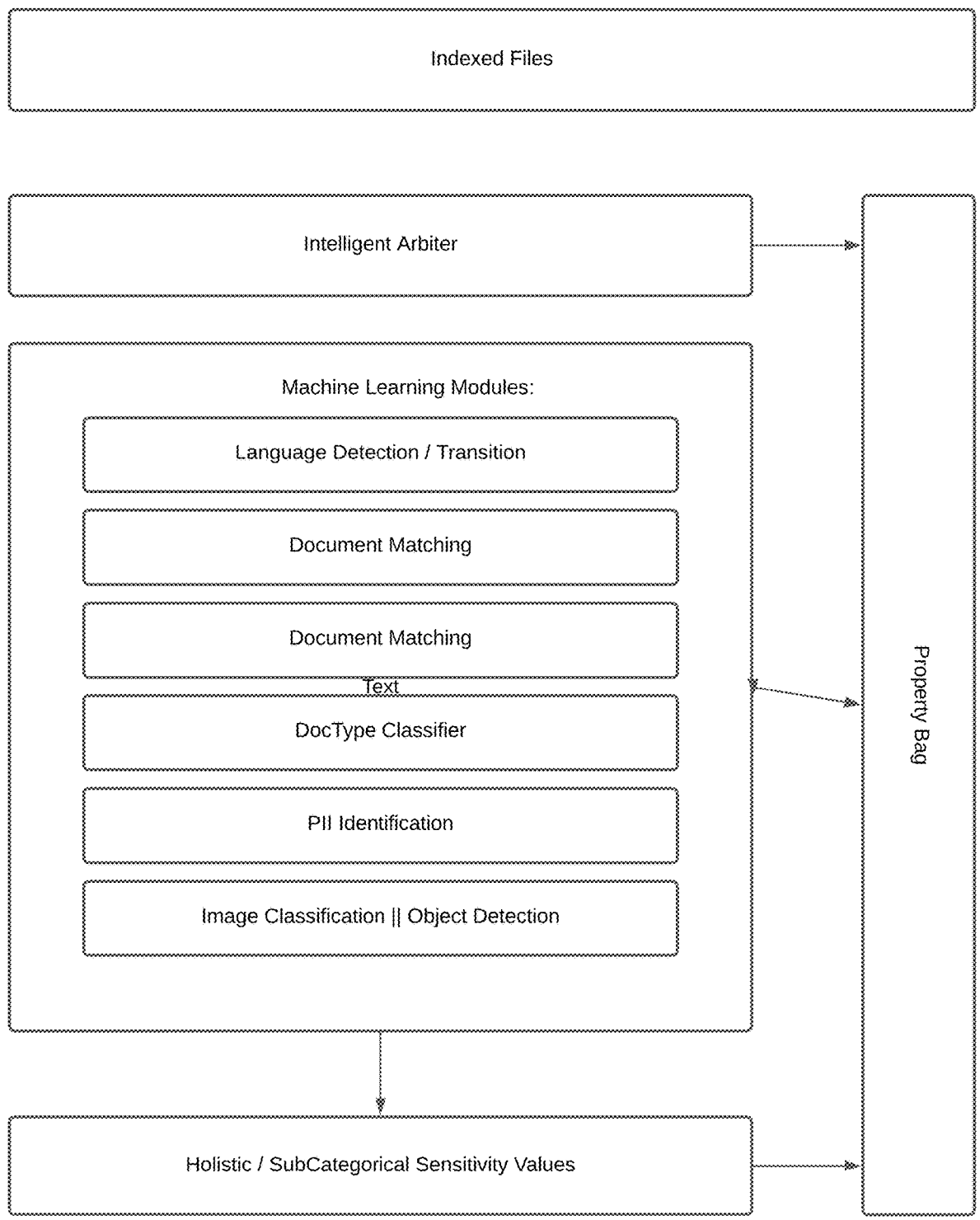
FIG. 3 illustrates a schematic representation of a first implementation of one or more sub-components of the system 100 in accordance with one or more embodiments of the present application.

In one or more embodiments, the classification subsystem 120 includes a machine learning module or subsystem that may be intelligently configured to predict various classifications for each target file or target document including, but not limited to, identifying a document type, identifying sensitive information, identifying a document's language (e.g., via a language detection model), identifying objects or images, identifying document form values, and/or the like. In such embodiments, the classification subsystem 100 may include a plurality of distinct machine learning-based classification submodules, which may be outlined herein below in the method 200 and as shown generally by way of example in FIG. 3.

Additionally, or alternatively, in some embodiments, the classification subsystem 100 may include one or more content classification modules that include extensible classification heuristics derived from one or more of subscriber-defined content policy and/or data handling service-derived content policy.

Additionally, or alternatively, the classification subsystem 100 may implement one or more ensembles of trained machine learning models. The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a machine learning classifier, computer vision model, convolutional neural network (e.g., ResNet), visual transformer model (e.g., ViT), object detection model (e.g., R-CNN, YOLO, etc.), regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a semantic image segmentation model, an image instance segmentation model, a panoptic segmentation model, a keypoint detection model, a person segmentation model, an image captioning model, a 3D reconstruction model, a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation from transformers (BERT) for masked language model tasks and next sentence prediction tasks and the like, variations of BERT (i.e., ULMFIT, XLM UDify, MT-DNN, SpanBERT, ROBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

1.3 Content Sensitivity Mitigation Subsystem

Figure 7:
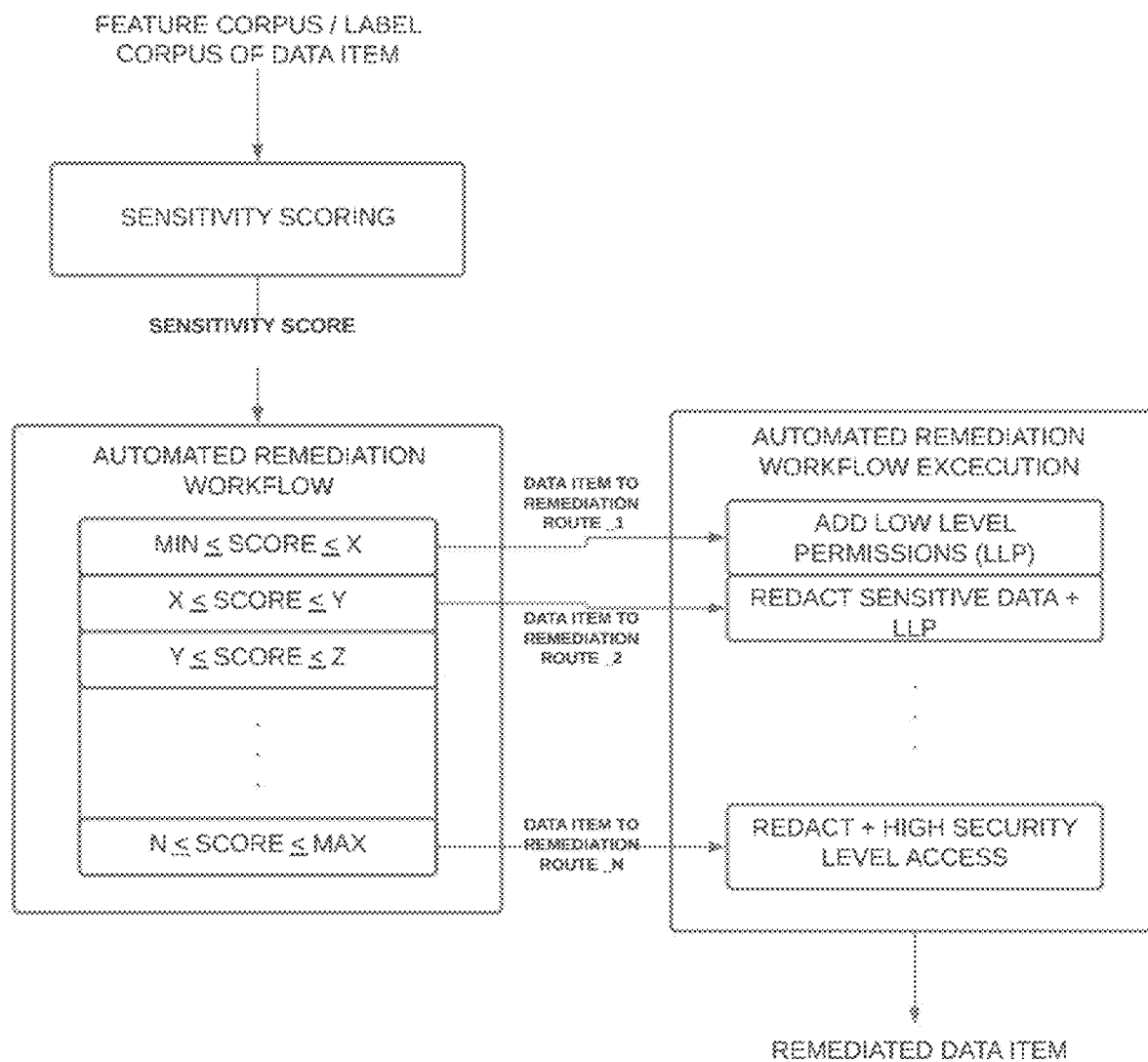
FIG. 7 illustrates a schematic representation of an example of implementing a sensitivity evaluation stage for handling a data item in accordance with one or more embodiments of the present application.

The sensitivity mitigation subsystem 130 preferably functions to perform one or more automated actions that reduces a sensitivity of a target file or target content or otherwise, improves a security of a target file or target content for protecting sensitive or secure content/information, as shown generally by way of example in FIG. 7. Sensitive information or data preferably relate to data that must be guarded from unauthorized access and unwarranted disclosure to maintain the information security of an individual or an organization. In one or more embodiments, sensitive information may be defined based on subscriber information security policy or file system policy. In some embodiments, sensitive information may be defined based on data handling service-defined file system policy.

The sensitivity mitigation subsystem 130 may include a plurality of distinct automated sensitivity mitigation workflows or the like to which a target file or target content may be intelligently routed based on classification data.

1.4 Automated Document Identification Module

The content route handling subsystem 140 preferably functions to intelligently route each target file or target content based on classification inferences or predictions of the classification subsystem 120. In some embodiments, a succeeding or new file system of a subscriber may include a predetermined configuration for ingesting and/or storing target digital items and content. In such embodiments, the content route handling subsystem 140 may be configured based on the storage parameters and/or configurations of the succeeding file system(s) and perform a routing of target files and target content to appropriate regions or partitions of the succeeding file system(s).

Additionally, or alternatively, the content route handling subsystem 140 may function to route distinct target files and/or target content to the sensitivity mitigation subsystem 130 based on the one or more features discovered and classifications of the classification subsystem 120.

1.5 Automated Training Sample Sourcing Subsystem

Figure 8:
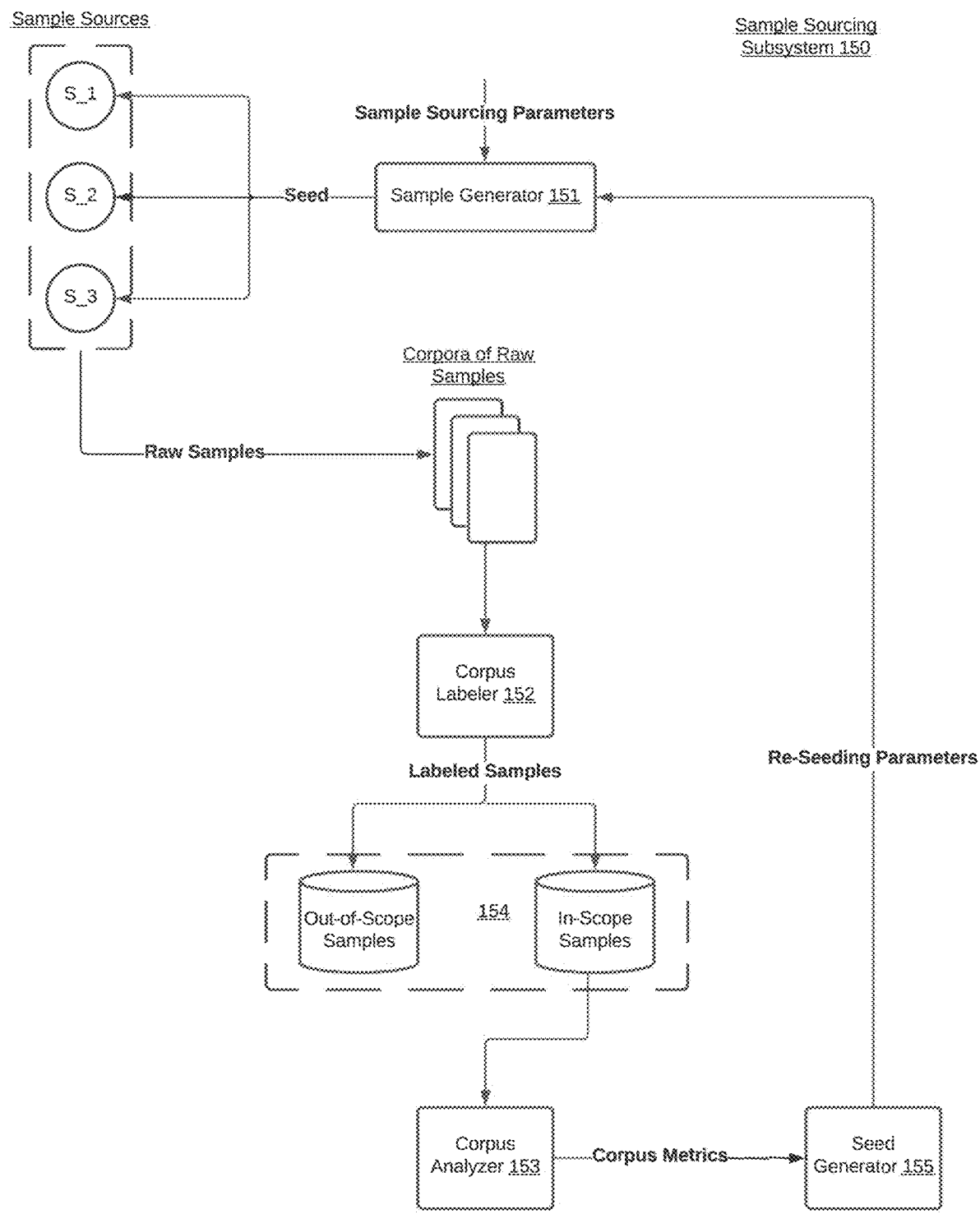
FIG. 8 illustrates a schematic representation of an example of a sample sourcing subsystem of the system 100 in accordance with one or more embodiments of the present application.

The automated training sample sourcing subsystem 150 preferably includes a document-image generator interface 151, a corpus annotations module 152, a training corpus analyzer (module) 153, one or more training sample repositories 154, and/or a seed/re-seed generator 155, as shown by way of example in FIG. 8. In a preferred embodiment, the automated training sample sourcing subsystem 150 may function to source document and/or image training data samples via a document-image generator 151 that may be in operable communication with a plurality of sources of training data samples. In a preferred embodiment, the document-image generator 151 may be seeded with sourcing parameters that may be used in generating requests for document and/or image training data sources to various of the plurality of sources of training data samples.

It shall be recognized that the document-image generator interface 151 may be interchangeably referred to herein as an image generator interface and may be additionally configured for sourcing corpora of image samples. It shall also be recognized that while in the description provided herein reference is preferably made to a sourcing and handling of document samples, the sourcing and handling of image samples should also be implied in each instance when not expressly described or mentioned.

The corpus annotations module 152 preferably functions to ingest a corpus of unlabeled document samples or image samples and compute classification labels and/or annotations for each distinct sample within a target corpus of document samples.

The training corpus analyzer (module) 153 preferably functions to evaluate one or more attributes of a corpus of document samples or image samples being sourced for training a target machine learning model. In one or more embodiments, the training corpus analyzer 153 may be configured to automatically compute one or more corpus metrics that indicate a likely level of efficacy of a target corpus of training data samples for potentially training a target machine learning model on a specific task.

The one or more training sample repositories 154 may function to store the corpus of labeled document samples. In a preferred embodiment, the one or more training sample repositories may be bifurcated into two distinct repositories in which a first repository may function to store in-scope labeled document samples and a second repository may function to store out-of-scope labeled document samples.

The seed/re-seed generator 155 may function to generate one or more document sourcing parameters for sourcing one or more corpora of document samples from a plurality of distinct sources of document samples. In some embodiments, the re-seed generator 155 may function to generate re-seeding sourcing parameters based on an evaluation of a pending corpus of document samples. That is, calculated corpus metrics and/or identified corpus deficiencies may inform a derivation of one or more seed sourcing parameters for a continued creation or build out of one or more corpus of document or image samples.

2. Methods for Configuring Virtual Queues Based on Unstructured Data

As shown in FIG. 2, a method 200 for configuring virtual queues curated with metafiles derived from unstructured data items includes accessing one or more repositories storing unstructured data S210, generating classification metadata for items of unstructured data S220, generating a residency pointer for items of unstructured data based on residency metadata S230, constructing an unstructured data metafile for items of unstructured data S240, and configuring a plurality of virtual queues with unstructured data metafiles S250.

2.10 Accessing Unstructured Data

S210, which includes accessing unstructured data, may function to establish one or more data handling nexus for identifying and accessing unstructured data within one or more distinct data repositories and/or storage devices. A data handling nexus, as referred to herein, preferably relates to a data communication channel through which unstructured data may be identified, accessed, and manipulated via a data handling system or service (e.g., system or service 100). In one or more embodiments, a data handling nexus may additionally or alternatively relate to and/or comprise a bidirectional communication channel that enables a communication of one or more digital entities or items of unstructured data from a data repository associated with a subscriber to a target file system or target data storage system. Additionally, a file system a data repository as referred to herein may relate to any system or device for one or more of digital item management, digital item governance, and digital item storage (e.g., MICROSOFT 365, SHAREPOINT, BOX, GOOGLE DRIVE, DROPBOX, electronic content management systems (ECMs), network file systems (e.g., NFS, SAN, NAS, etc.), and/or the like). Additionally, or alternatively, S210 may function to access unstructured data via various endpoints including, but not limited to, various devices, applications, or software agents operating on an enterprise network storing enterprise-associated data.

Intelligent Accessing of Sources of Unstructured Data

In a first implementation, S210 may function to implement a data handling nexus that includes a programmatic connection between the one or more distinct data repositories or storage devices and an external entity (i.e., a remote data handling service) performing one or more data management operations of unstructured data within the one or more distinct data repositories. In this first implementation, a data handling API of the data handling service may function to connect with or interface with one or more APIs associated with each of the one or more distinct data repositories. In this way, the data handling service via the data handling API or the like may function to automate one or more of file system scanning and discovery and file data handling based on API requests/calls or the like.

In a second implementation, S210 may function to implement a data handling nexus by implementing one or more access agents with the one or more distinct data repositories. In this second implementation, S210 may function to create one or more (digital) access agents based on subscriber data handling policy or the like that may be digitally installed at each of one or more distinct data repositories. In one or more embodiments, the one or more access agents may function to enable a communication between the one or more distinct data repositories and one or more of a data handling API or a data handling controller (e.g., an agent manager) of the remote data handling service.

Intelligent Scanning & Discovery of Unstructured Data

S210, which includes implementing unstructured data discovery, may function to scan the one or more distinct data repositories for unstructured data. In some embodiments, a discovery or identification of file systems includes identifying each of a plurality of data repositories and memory locations that store at least one piece or item of unstructured data or content, structured data content or any type of electronic file. The piece or item of content may be any type or kind of content including, for example, but should not be limited to, electronic documents, text message data, chat messaging data, applications data, digital media, video recordings/messages, audio recordings/messages, image data, and/or the like. Accordingly, any suitable data repository including, for example, electronic communication data (e.g., emails), chat messaging repositories, data compression repositories, and/or the like may be identified in a discovery phase and scanned for unstructured data.

Additionally, or alternatively, in a first implementation, the discovery of the one or more distinct data repositories and/or storage devices may be automated based on file system policy instructions of a subscriber. In such embodiments, S210 may function to configure an automated search and/or automated discovery of one or more enumerated file system types based on the file system policy instructions and/or file discovery parameters. That is, in this first implementation, S210 may function to program, design, and/or configure one or more unstructured content or file discovery agents based on file discovery parameters that may function to identify the one or more distinct data repositories and inventory or enumerate the one or more items of unstructured data stored within the one or more distinct data repositories.

Additionally, or alternatively, the one or more file systems may be any suitable file system type or file system service including, but not limited to, on-premises data services and/or data repositories, third-party or vendor data services or repositories (e.g., cloud-based systems), digital or electronic content management services, and/or the like.

In a second implementation, S210 may function to perform file system discovery based on service-derived search and discovery parameters. In one or more embodiments in which subscriber file policy may be nonexistent or lacking in sufficient discovery parameters, S210 may function to implement service-defined discovery parameters, which may include searching or crawling network traffic and the like for discovering hidden or missed file systems. For instance, S210 may function to configure a discovery agent or the like that functions to inspect in-transmission data packets that may be stored by a network component or by a third-party service or third-party application.

It shall be recognized that S210 may function to configure each of the access agent and the discovery agent to interface with structured file systems and unstructured file systems.

2.20 Classifying Unstructured Data

S220, which includes generating classification metadata for items of unstructured data, may function to evaluate each of a plurality of items of unstructured data and generate, via a machine learning-based classification system, classification metadata for each respective item of unstructured data. The machine learning-based classification system may include a combination of distinct classifiers including machine learning-based classifiers and heuristics-based classifiers. In one or more embodiments, the classification metadata may include one or more classification predictions, labels, and/or tags for a given item of unstructured data, which may be derived or produced from outputs of the machine learning-based classification system.

Feature Extraction

In one or more embodiments, generating classification metadata may initially include implementing feature discovery and feature extraction. In such embodiments, S220 may function to evaluate each item of unstructured data for one or more extractable features. In one or more embodiments, S220 may function to implement a feature extractor that is configured or specifically designed for identifying file or content features of an item of unstructured data that may support an inference or an estimation of a likely file type or content type for each item of unstructured data. In one or more embodiments, the extracted features by the feature extractor may be converted to model or system input and/or the like for classifying each item of unstructured data.

S220 may function to aggregate features of a target item of unstructured data to a feature container or feature corpus that includes a collection of the features of the target item of unstructured data and the like. In a preferred embodiment, S220 may function to compute a corpus of feature vectors based on a feature container for each target item of unstructured data. In such embodiments, S220 may function to implement or use one or more content embeddings models or services that may function to convert the unstructured data features or content features to distinct feature vector values. In some embodiments, S220 may function to implement multiple, distinct embeddings models and/or services for each distinct feature type (e.g., object features, text features, etc.). Accordingly, for each target item of unstructured data, S220 may function to compute a corpus of feature vectors comprising a plurality of distinct feature vectors based on the feature container for a target item of unstructured data.

Classification

Accordingly, based on extracting features of items of unstructured data, S220 may function to classify each item of unstructured data based on an associated feature corpus to one or more of a plurality of distinct classes or categories of file type or content type.

Machine Learning-Based File/Content Classification

In a first implementation, S220 may function to implement a machine learning-based content classification module. In this first implementation, the machine learning-based content classification module comprises one or more machine learning classifiers designed and trained to predict a file or a content classification or type for each target item of unstructured data or a target piece of item of unstructured content. In this first implementation, the unstructured data classification inference may be used to inform a data handling route and/or data handling policy that should be automatically executed for handling a target item of unstructured data.

Additionally, or alternatively, in some embodiments, the machine learning-based file or content classification inference may be considered or may be referred herein as a virtual queue classification inference or the like. In such embodiments, the virtual queue classification inference includes a content classification inference performed during a configuration of a plurality of virtual queues that may be configured to store metafiles for each item of unstructured data rather than storing each respective item of unstructured data in the virtual queues. In this way, a migration or other data handling techniques of the items of unstructured data from their respective storage locations within each of a plurality of distinct data repositories may not have to be performed. At least one technical advantage of such method and/or process includes a reduction of computing resources required for a repeated search and discovery of unstructured data within a plurality of distinct data repositories for operating or executing one or more downstream applications of a given subscriber. Since, in some embodiments, the one or more downstream applications may require access and/or usage of unstructured data having a storage residency in one or more of the plurality of distinct data repositories, the method 200 virtualizes and centralizes the storage locations of the items of unstructured data to the plurality of virtual queues without actually migrating the files, per se, associated with the items of unstructured data to the plurality of virtual queues but merely a lightweight metafile that includes a reference pointer or the like to the actual file of each item of unstructured data within the plurality of distinct data repositories associated with a given subscriber.

In a preferred embodiment, the machine learning-based unstructured data classification module may be configured or trained to predict a plurality of distinct unstructured data or content types. That is, the machine learning-based content classification module may function to produce at least one inference for a type of class labeling for each target item of unstructured data or target content, preferably, based on an input of a corpus of feature vectors of the target item of unstructured data or target content.

In one embodiment, the machine learning-based content classification module includes an ensemble of distinct machine learning models that may function to operate in concert to produce a single unstructured classification metadata for a target item of unstructured data or target content. In another embodiment, each distinct machine learning model of the ensemble may function to produce a distinct inference of a distinct item of unstructured data or content classification.

2.30 Generating Residency Pointers

S230, which includes generating residency pointers for items of unstructured data, may function to generate a residency pointer for each of a plurality of items of unstructured data identified within each of the plurality of distinct data repositories based on residency metadata. Residency metadata, in one or more embodiments, may function to identify or pinpoint an exact storage residency or location of each unstructured data item within a given data repository of the plurality of distinct data repositories.

In one or more embodiments, S230 may further include extracting residency metadata for each item of unstructured data identified with one or more of the plurality of distinct data repositories. Residency metadata for a given item of unstructured data, in such embodiments, preferably includes, but should not be limited to, data relating to a storage location, file path, memory address a repository type, access credentials, access permissions, and/or the like. Accordingly, extracting residency metadata for a given item of unstructured data may include querying, by a remote data handling service (e.g., system or service 100) or the like, the accessed data repository for any suitable information relating to a given item of unstructured data that enables an identification of a storage location of the given item and mechanisms (e.g., credentials, permissions, and/or the like) for successfully accessing the given item.

Additionally, or alternatively, S230 may function to generate a residency pointer for each item of unstructured data based on the extracted residency metadata. In such embodiments, the residency pointer may function as a digital record that uniquely identifies the storage location of a given item of unstructured data. That is, a residency pointer preferably provides a direct reference to a storage location of a given item of unstructured data thereby eliminating a need for repeated searches or scans across data repositories. Accordingly, S230 may function to encode the residency pointer with one or more of a repository identifier, a file path or Uniform Resource Identifier (URI), a storage type (e.g., NFS, SAN, NAS, and the like, and/or access credential or tokens required for data retrieval or accessing the given item of unstructured data.

In or more embodiments, S230 may function to structure the residency pointer in a standardized format that may be compatible across different repositories and/or data storage systems (e.g., data storage devices). In such embodiments, the standardized format of the residency pointer may include a cell or a field for storing each attribute of residency metadata. Technical advantages of such standardized formatting may include enabling an ease of parsing the residency pointer data and the interpretation by other systems or components of a data management system or service thereby facilitating seamless integration and interoperability.

Additionally, or alternatively, the residency may preferably be stored in a centralized data structure, such as a virtual queue or a residency pointer repository. As described in more details below, in one or more embodiments, each entry of a residency pointer in the centralized data structure may be linked to corresponding classification metadata of a given item of unstructured data thereby forming a composited and/or comprehensive data record for the given item of unstructured data.

2.40 Constructing an Unstructured Data Metafile

S240, which includes constructing an unstructured data metafile for items of unstructured data S240, may function to consolidate and organize metadata extracted from items of unstructured data and residency data into a unified metafile having a structured format thereby enabling efficient management and accessing of the items of unstructured data.

In one or more embodiments, in response to mapping each item of unstructured data to a corresponding storage or residency location of the respective item of unstructured data via a residency pointer, S240 preferably functions to aggregate classification metadata, residency pointer data, and/or residency metadata for each item of unstructured data to generate an unstructured data metafile for each item of unstructured data. The unstructured data metafile, as referred to herein, preferably relates to a file or data record that includes a structured composite of metadata associated with unstructured data and a pointer that identifies a memory or storage location of the unstructured data. In one or more embodiments, a structure of the metafile includes fields for various attributes for a given item of unstructured data including, but not limited to, a unique identifier (e.g., filename), classification metadata (e.g., categories, tags, sensitivity level, and/or the like), a residency pointer (e.g., repository identifier, file path, access credentials, and/or the like), and/or additional metadata (e.g., creation data, modification date, file size, and/or the like).

Additionally, or alternatively, S240 may function to encode the unstructured data metafile in any suitable manner including, but not limited to, JSON format, XML format, tabular format, and/or similar schema that support efficient representation and/or querying of metadata for unstructured data stored in a plurality of distinct data repositories.

Additionally, or alternatively, each unstructured data metafile may be uniquely linked or mapped to a distinct item of unstructured data that is stored within a given data repository. In one or more embodiment, the unique link or nexus between an item of unstructured data within a data repository and a corresponding unstructured data metafile may include a combination of the unique identifier and residency pointer components of the unstructured data metafile. In such embodiments, the unique linkage and/or nexus may ensure that any operation performed with reference to the unstructured data metafile may be mapped to and performed against the actual item of unstructured data regardless of the storage residency of the item of unstructured data. Additionally, or alternatively, the unique linkage and/or nexus between items of unstructured data within the plurality of distinct data repositories and the unstructured data metafiles may function to facilitate efficient navigation and management of unstructured data by providing an efficient and organized structure for accessing and manipulating the unstructured data.

2.50 Configuring Virtual Queues with Unstructured Data Metafiles

Figure 9:
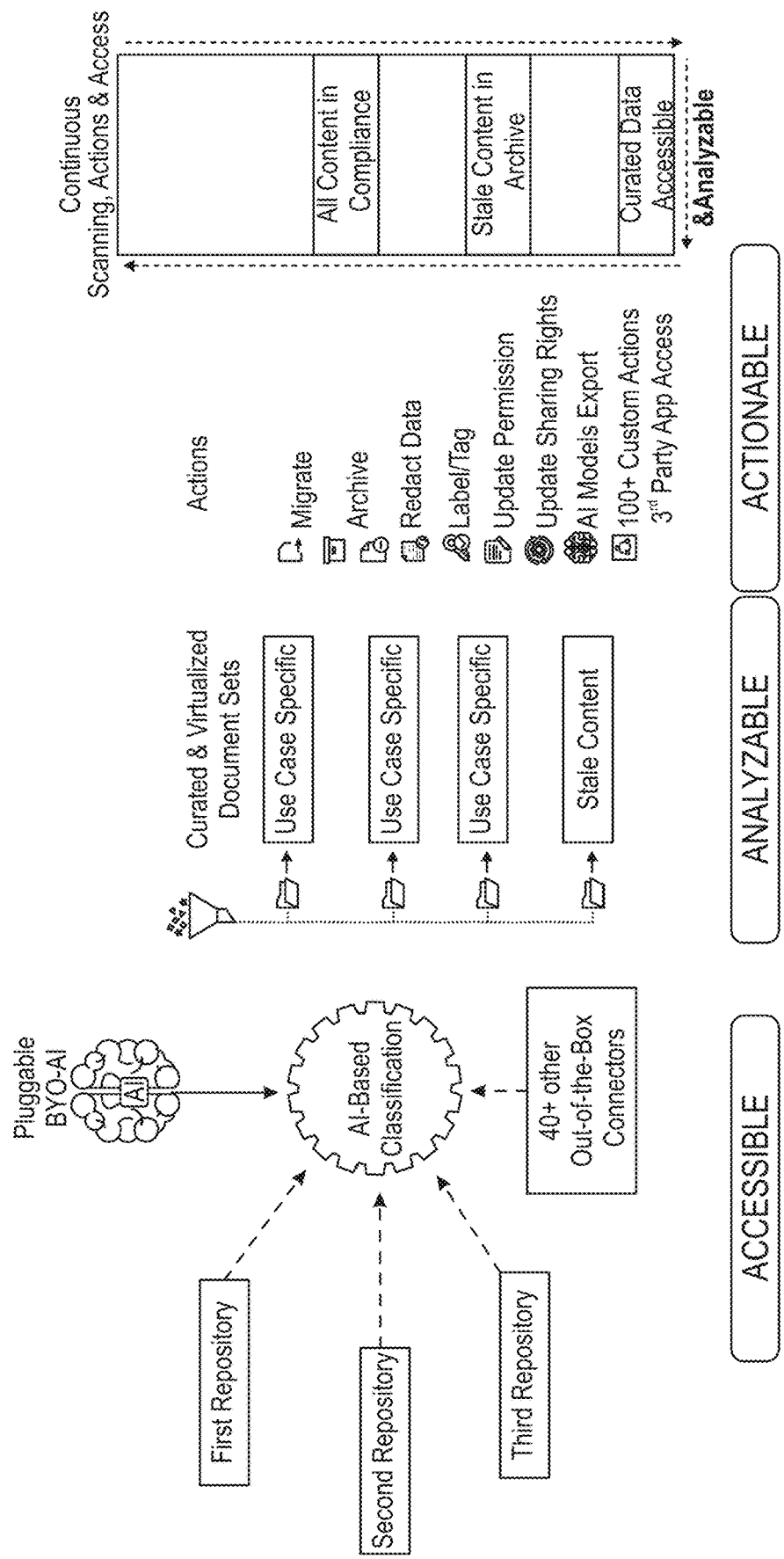
FIG. 9 illustrates a schematic representation of a system implemented at a remote data handling service for curating virtual queues with metafiles of unstructured data in accordance with one or more embodiments of the present application.

S250, which includes configuring a plurality of virtual queues based on unstructured data metafiles, may function to construct and/or configure a plurality of distinct virtual queues curated with metafiles associated with items of unstructured data stored with the plurality of distinct data repositories, as shown by way of example in FIG. 9. In a preferred embodiment, the plurality of virtual queues may be integrated with one or more data handling systems and/or a data handling user interface, such as a graphical user interface, thereby enabling interoperability with other tools and applications. As a non-limiting example, the plurality of virtual queues may be integrated with artificial intelligence (AI) models, AI training systems, data governance systems, compliance tools, and/or third-party applications.

Each of the plurality of virtual queues preferably relate to a virtual storage construct created by a remote data handling service implementing and/or executing the method 200 and/or the system or service 100. In one or more embodiments, a general configuration and/or operative function of each of the plurality of virtual queues may be informed by data handling policy of a given subscriber to the remote data handling service. In such embodiments, the data handling policy, which may include data filtering or data routing policies, preferably provide a plurality of criteria for managing and/or storing the metafiles of the items of unstructured data being stored in the plurality of distinct data repositories. As a non-limiting example, S250 executing data handling policy of a given subscriber may function to configure each distinct virtual queue of a plurality of virtual queues to store metafiles based on classification metadata. That is, in this example, each virtual queue of the plurality of virtual queues may be configured to receive and store metafiles having a distinct classification metadata attribute. In this way, the plurality of virtual queues may include a first virtual queue being encoded to store metafiles with classification metadata of a first type, a second virtual queue being encoded to store metafiles with classification metadata of a second type, and the like. It shall be recognized that a given virtual queue may be encoded to more than one type of classification metadata. That is, a virtual queue may be encoded to receive and store metafiles in which the metafiles have a mixture or various classification metadata attributes.

Accordingly, based on data handling policy of a subscriber, the remote data handling service may function to create, via the method 200 or another method, and specifically design each of the plurality of virtual queues to store various subsets of unstructured data metafiles according to an attribute of the unstructured data metafiles. In one or more embodiments, S250 may function to configure and/or implement a metafile filter or a metafile router that preferably functions to filter or route a given unstructured data metafile to at least one of the plurality of virtual queues based on attributes of the given unstructured data metafile.

In operation, S250 implementing a metafile filter or a metafile router may function to read or scan the content or attributes of the unstructured data metafile and filter or route the unstructured data metafile to one virtual queue of the plurality of virtual queues based on the unstructured data metafile having an attribute that matches an encoded or designated attribute of the one virtual queue.

Accordingly, S250 implementing a metafile filter and/or a metafile router preferably functions to assign each unstructured data metafile according to filtering logic or routing logic informed by data handling policy for a given subscriber. As described above, the filtering logic or routing logic may include attribute-based routing or filtering rules that, when executed, assign an unstructured data metafile having an attribute or content that satisfies a storage criteria of a given virtual queue of the plurality of virtual queues.

It shall be recognized that each of the plurality of virtual queues may be dynamic and continuously updated based on changes in the unstructured data and their corresponding metafiles. In one or more embodiments, the method 200 may include periodically adding new unstructured data metafiles, removing or deleting obsolete metafiles, and/or reassigning metafiles as attributes of the underlying item of unstructured data changes thereby changing the attributes of the corresponding metafile.

Additionally, or alternatively, each of the plurality of virtual queues, once configured and/or curated with unstructured data metafiles, may function to enable batch operations via an API or web-based user interface (i.e., a graphical user interface) thereby allowing users to apply or perform actions on the underlying items of unstructured data simultaneously and in bulk by leveraging the residency pointers within a given virtual queue to perform various data management operations and/or application-specific operations including, but not limited to, data retrieval, data migration, data annotation, data archiving, data compliance verifications, updating permissions of unstructured data, with minimal latency and computing system overhead.

2.6 Data Handling Operations via Virtual Queues

Additionally, or optionally, S260, which includes executing data handling requests via the virtual queues, may function to enable an execution of one or more data handling requests via an operation of the plurality of virtual queues. A data handling request, as referred to herein, preferably relates to an instruction or a command causing one or more operations of the plurality of virtual queues and preferably a corresponding action against data, such as an access or a manipulation of data across one or more data repositories, devices, and/or file systems.

As shown by way of example in FIG. 10, in a preferred embodiment S260, which includes S262, may include receiving the one or more data handling requests via a data handling interface (e.g., a user interface, an application programming interface (API), or the like). In one or more embodiments, S262 may enable any suitable software application and/or modules to interface with the plurality of virtual queues via a data handling API configured to operate and/or manipulate, submit requests to, return data from, and/or manipulate the plurality of virtual queues in any suitable manner. Additionally, or alternatively, in one or more embodiments, S262 may enable a user and/or admin operating a data handling user interface to submit requests to and/or perform operations with the plurality of virtual queues.

Additionally, or alternatively, in response to receiving a data handling request via the data handling interface or the like, S260, which includes S264, may function to use at least part of the data handling request to query the plurality of virtual queues. In one or more embodiments, the data handling request may be converted into a structured query, such as SQL, and applied in a search of the metafiles of the plurality of virtual queues. Accordingly, in some embodiments, the search of the plurality of virtual queues may be based on identifying exact tokens matches between one or more tokens of the data handling request and the tokens of the metafiles of the plurality of virtual queues. In one or more other embodiments, the search of the plurality of virtual queues may be based on identifying semantic matches (e.g., vector or embeddings-based matches) between the tokens of the data handling request and the tokens of the metafiles of the plurality of virtual queues. As a non-limiting example, a data handling request may include a category token that exactly matches a category or classification token within a metafile of a virtual queue. In such non-limiting example, S264 may function to identify a (request) match between the data handling request and the metafile of the virtual queue. Similarly, in another non-limiting example, S264 may function a semantic match between a category token of the data handling request and a category or classification token of the metafile of the virtual queue.

In response to processing the data handling request and/or query, S260, which includes S266, may function to cause one or more of the plurality of virtual queues satisfying requirements of the data handling request to return or identify one or more metafiles and, in some embodiments, a corpus of metafiles. In one or more embodiments, S266 may function to return to a user interface of the data handling interface each of the one or more metafiles. In this way, a quality or accuracy of the results of the data handling request may be verified.

In one or more embodiments, based on identifying or returning the one or more metafiles of the plurality of virtual queues based on a search using the data handling request, S260, which includes S268, may function to automatically use or execute the residency pointers of the one or more metafiles to locate the associated items of data within one or more of the plurality of data repositories thereby establishing an operational nexus between the data handling interface and the items of data for performing one or more operations against or operations using the items of data. In a first non-limiting example, based on executing the residency pointers of the metafiles, S268 may function to execute one or more operations for modifying in-place the items of data corresponding to the metafiles. That is, via the data handling interface that is remote from the plurality of data repositories and/or devices storing the items of data, S268 may enable one or more actions and/or operations that enable a modification of the files storing the items of data without having to move or make copies of the items of data. In a second non-limiting example, based on executing the residency pointers of the metafiles, S260 may function to execute one or more operations that modify metadata and/or access parameters (e.g., permissions) of the items of data. In a third non-limiting example, based on executing the residency pointers of the metafiles, S260 may function to execute one or more operations that may alter a residency of the items of data, such as migrating the items of data from an incumbent data repository (e.g., a first file system) to a succeeding data repository (e.g., a second file system). In yet a fourth non-limiting example, S268 may function to execute one or more operations that generate artifacts (e.g., reports) derived based on the items of data. It shall be recognized that these non-limiting examples are not intended to describe all possible operations or actions that may be applied to items of data and that, in some embodiments, the operations are extensible and may be defined by unique software applications operating via the data handling interface and/or may include unique user-defined operations or actions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that similar to a method with contingent steps, a system or computer readable storage medium can repeat the steps of a method as many times as are needed to ensure that all of the contingent steps have been performed.

As a person skilled in the art will recognize from the previous detailed description and from the figures and claims, modifications and changes can be made to the preferred embodiments of the invention without departing from the scope of this invention defined in the following claims.

We claim:

1. A computer-implemented method comprising:
at a remote data handling service implemented by a network of distributed computers:
programmatically accessing, via one or more application programming interfaces (APIs), API endpoints at each of a plurality of distinct online data repositories associated with a subscriber to the remote data handling service;
automatically locating unstructured data items by scanning, by one or more computers of the remote data handling service, computer memory of each of the plurality of distinct online data repositories;
in response to identifying a storage location for each of the unstructured data items discovered during the scan within the computer memory of each of the plurality of distinct online data repositories:
automatically generating, by the one or more computers of the remote data handling service, classification metadata for each of the unstructured data items, wherein the classification metadata indicates a likely artifact category of a plurality of distinct artifact categories for each of the unstructured data items;
automatically generating, via the one or more computers of the remote data handling service, a residency pointer for each of the unstructured data items based on the respective storage location within the plurality of distinct online data repositories associated with each of the unstructured data items, wherein the residency pointer comprises an identifier of one of the plurality of distinct online data repositories and a given storage location of a given unstructured data item associated with the residency pointer;

using (a) the classification metadata and (b) the residency pointer to automatically construct, by the one or more computers of the remote data handling service, an unstructured data metafile for each of the unstructured data items, wherein the unstructured data metafile comprises a new data record having a file structure including:

(1) a first field storing a filename of an associated unstructured data item, (2) a second field storing given classification metadata of the associated unstructured data item, and (3) a third field storing a given residency pointer of the associated unstructured data item;

configuring, by the one or more computers of the remote data handling service, each virtual queue of a plurality of virtual queues to store corresponding one or more subsets of unstructured data metafiles, wherein each virtual queue of the plurality of virtual queues comprises a virtual storage that is constructed at the remote data handling service, wherein each corresponding one or more subsets of unstructured data metafiles is associated with a distinct classification category and each virtual queue of the plurality of virtual queues stores only the corresponding one or more subsets of unstructured data metafiles associated with the distinct classification category;

integrating the plurality of virtual queues with a web-based data handling interface controlling batch operations against the unstructured data items stored in each of the plurality of distinct online data repositories, wherein, via the web-based data handling interface, the remote data handling service executes a data handling request against a given virtual queue of the plurality of virtual queues causing a corresponding one or more computer operations that:

use given residency pointers of the corresponding one or more subsets of unstructured data metafiles stored within the given virtual queue to locate a set of unstructured data items stored by the plurality of distinct online data repositories, and automatically, remotely apply by the remote data handling service a given batch data operation of the data handling request against the set of unstructured data items.

2. The computer-implemented method according to claim 1, further comprising:

obtaining, via the web-based data handling interface, the data handling request;

in response to obtaining the data handling request, using the data handling request to perform a search of the plurality of virtual queues; and returning from the plurality of virtual queues a corpus of metafiles based on the performance of the search.

3. The computer-implemented method according to claim 1, wherein each of the plurality of virtual queues comprises a metafile index associated with a given artifact category of the plurality of distinct artifact categories, and wherein the metafile index sorts unstructured data metafiles having a given classification metadata associated with the given artifact category.

4. The computer-implemented method according to claim 1, wherein each virtual queue of the plurality of virtual queues comprises a metafile data structure (1) assigned to at least one distinct application of a plurality of distinct applications and (2) that stores unstructured data metafiles accessible to the at least one distinct application.

5. The computer-implemented method according to claim 1, wherein each virtual queue of the plurality of virtual queues was created in a database associated with the remote data handling service, and wherein each virtual queue is distinct from the plurality of distinct online data repositories storing the unstructured data.

6. The computer-implemented method according to claim 1, wherein the residency pointer comprises a digital record stored within a database associated with the remote handling service.

7. The computer-implemented method according to claim 1, wherein:

the one or more computers of the remote data handling service uses a machine learning-based classifier comprising a large language model to automatically generate the classification metadata for each of the unstructured data items.

8. The computer-implemented method according to claim 1, further comprising:

curating a corpus of training data samples comprising a subset of the unstructured data items based on the execution of the data handling request, wherein the data handling request comprises a copying operation, wherein curating the corpus of training data samples includes:

identifying the given virtual queue of the plurality of queues having a plurality of unstructured data metafiles associated with the subset of the unstructured data items;

executing the copying operation against the subset of the unstructured data items from one or more of the plurality of distinct data repositories; and in response to executing the copying operation, storing copies of the subset of the unstructured data items to a given memory of the remote data handling service accessible to an application that trains a machine learning model.

9. The computer-implemented method according to claim 1, wherein each virtual queue of the plurality of virtual queues comprises tabular data structure with cells that store the classification metadata and the residency pointer for each unstructured data item, wherein the cells of each virtual queue of the plurality of virtual queues includes:

a first plurality of cells storing the classification metadata for each of the unstructured data items, and a second plurality of cells storing the residency pointer for each of the unstructured data items.

10. The computer-implemented method according to claim 1, further comprising:

automatically accessing the plurality of distinct data repositories on a pre-defined schedule;

identifying new unstructured data based on the accessing; and in response to identifying the new unstructured data, updating one or more of the plurality of virtual queues with new unstructured data metafiles associated with the new unstructured data.

11. A computer-program product comprising a non-transitory machine-readable storage medium storing computer instructions that, when executed by one or more processors, perform operations comprising:

at a remote data handling service implemented by a network of distributed computers:

programmatically accessing, via one or more application programming interfaces (APIs), API endpoints at each of a plurality of distinct online data repositories associated with a subscriber to the remote data handling service;

automatically locating unstructured data items by scanning, by one or more computers of the remote data handling service, computer memory of each of the plurality of distinct online data repositories;

in response to identifying a storage location for each of the unstructured data items discovered during the scan within the computer memory of each of the plurality of distinct online data repositories:

automatically generating, by the one or more computers of the remote data handling service, classification metadata for each of the unstructured data items, wherein the classification metadata indicates a likely artifact category of a plurality of distinct artifact categories for each of the unstructured data items;

automatically generating, via the one or more computers of the remote data handling service, a residency pointer for each of the unstructured data items based on the respective storage location within the plurality of distinct online data repositories associated with each of the unstructured data items, wherein the residency pointer comprises an identifier of one of the plurality of distinct online data repositories and a given storage location of a given unstructured data item associated with the residency pointer;

using (a) the classification metadata and (b) the residency pointer to automatically construct, by the one or more computers of the remote data handling service, an unstructured data metafile for each of the unstructured data items, wherein the unstructured data metafile comprises a new data record having a file structure including:
(1) a first field storing a filename of an associated unstructured data item,
(2) a second field storing given classification metadata of the associated unstructured data item, and
(3) a third field storing a given residency pointer of the associated unstructured data item;

configuring, by the one or more computers of the remote data handling service, each virtual queue of a plurality of virtual queues to store corresponding one or more subsets of unstructured data metafiles, wherein each virtual queue of the plurality of virtual queues comprises a virtual storage that is constructed at the remote data handling service, wherein each corresponding one or more subsets of unstructured data metafiles is associated with a distinct classification category and each virtual queue of the plurality of virtual queues stores only the corresponding one or more subsets of unstructured data metafiles associated with the distinct classification category;

integrating the plurality of virtual queues with a web-based data handling interface controlling batch operations against the unstructured data items stored in each of the plurality of distinct online data repositories, wherein, via the web-based data handling interface, the remote data handling service executes a data handling request against a given virtual queue of the plurality of virtual queues causing a corresponding one or more computer operations that:
use given residency pointers of the corresponding one or more subsets of unstructured data metafiles stored within the given virtual queue to locate a set of unstructured data items stored by the plurality of distinct online data repositories, and
automatically, remotely apply by the remote data handling service a given batch data operation of the data handling request against the set of unstructured data items.

12. The computer-program product according to claim 11, wherein the residency pointer comprises a digital record stored within a database associated with the remote handling service.

13. The computer-program product according to claim 11, further performing operations comprising:
curating a corpus of training data samples comprising a subset of the unstructured data items based on the execution of the data handling request, wherein the data handling request comprises a copying operation, wherein curating the corpus of training data samples includes:
identifying the given virtual queue of the plurality of queues having a plurality of unstructured data metafiles associated with the subset of the unstructured data items;
executing the copying operation against the subset of the unstructured data items from one or more of the plurality of distinct data repositories; and
in response to executing the copying operation, storing copies of the subset of the unstructured data items to a given memory of the remote data handling service accessible to an application that trains a machine learning model.

14. The computer-program product according to claim 11, wherein each virtual queue of the plurality of virtual queues comprises tabular data structure with cells that store the classification metadata and the residency pointer for each unstructured data item, wherein the cells of each virtual queue of the plurality of virtual queues includes:
a first plurality of cells storing the classification metadata for each of the unstructured data items, and
a second plurality of cells storing the residency pointer for each of the unstructured data items.

* * * * *